US011151374B2

(12) United States Patent
Cugnet et al.

(10) Patent No.: US 11,151,374 B2
(45) Date of Patent: Oct. 19, 2021

(54) METHOD AND SYSTEM FOR GENERATING A SURFACE SIGNATURE

(71) Applicant: ARJO SOLUTIONS, Levallois Perret (FR)

(72) Inventors: Fanny Cugnet, Chambery (FR); Hubert Glasson, Le Haillan (FR); Hervé Guiot Du Doignon, La Motte Servolex (FR)

(73) Assignee: ARJO SOLUTIONS, Paris (FR)

( * ) Notice: Subject to any disclaimer, the term of this patent is extended or adjusted under 35 U.S.C. 154(b) by 148 days.

(21) Appl. No.: 16/329,971

(22) PCT Filed: Aug. 30, 2017

(86) PCT No.: PCT/FR2017/052307
§ 371 (c)(1),
(2) Date: Mar. 1, 2019

(87) PCT Pub. No.: WO2018/042127
PCT Pub. Date: Mar. 8, 2018

(65) Prior Publication Data
US 2019/0205642 A1 Jul. 4, 2019

(30) Foreign Application Priority Data
Sep. 1, 2016 (FR) ...................... 1658121

(51) Int. Cl.
*G06K 9/00* (2006.01)
*G06K 19/06* (2006.01)

(52) U.S. Cl.
CPC ... *G06K 9/00577* (2013.01); *G06K 19/06028* (2013.01); *G06K 19/06037* (2013.01);
(Continued)

(58) Field of Classification Search
CPC ......... G06K 9/00577; G06K 19/06028; G06K 19/06037; G06K 19/06112; G06K 2009/0059
See application file for complete search history.

(56) References Cited

U.S. PATENT DOCUMENTS

| 5,920,658 A | 7/1999 | Yamagata et al. |
| 7,680,306 B2 | 3/2010 | Boutant et al. |

(Continued)

FOREIGN PATENT DOCUMENTS

| EP | 1 971 960 B1 | 9/2008 |
| EP | 1 747 540 B1 | 9/2012 |

(Continued)

OTHER PUBLICATIONS

International Search Report dated Dec. 14, 2017, International Application No. PCT/FR2017/052307, 2 pages.
(Continued)

*Primary Examiner* — Mia M Thomas
(74) *Attorney, Agent, or Firm* — MH2 Technology Law Group LLP

(57) ABSTRACT

A method of generating at least one digital signature for at least one surface of a material element, referred to as an "examined surface." The method is performed by a data processor system, and may include, for each examined surface: obtaining an "offset" image having at least a portion showing the examined surface; obtaining at least one zone of interest in the offset image by putting into correspondence the offset image with at least one predetermined "equivalent" zone that is included in a model image having at least a portion representing a "reference" surface; obtaining a "registered" image by registering the offset image with the model image by applying a homography transformation to the offset image, wherein the transformation is obtained from the at least one zone of interest and the at least one
(Continued)

equivalent zone; and generating the digital signature, which characterizes the structure of the examined surface, from the registered image.

37 Claims, 9 Drawing Sheets

(52) U.S. Cl.
CPC ............... *G06K 19/06112* (2013.01); *G06K 2009/0059* (2013.01)

(56) References Cited

U.S. PATENT DOCUMENTS

| | | | |
|---|---|---|---|
| 8,325,971 | B2 | 12/2012 | Boutant et al. |
| 8,971,571 | B1 | 3/2015 | Starner et al. |
| 9,303,525 | B2 | 4/2016 | Aerts et al. |
| 2006/0198526 | A1 | 9/2006 | Saito |
| 2009/0324099 | A1 | 12/2009 | Hayashi |
| 2012/0039529 | A1* | 2/2012 | Rujan ............ G06K 19/06037 382/164 |
| 2014/0240603 | A1 | 8/2014 | Singer et al. |
| 2015/0317529 | A1* | 11/2015 | Zhou ................. G06K 9/18 382/190 |
| 2016/0104042 | A1* | 4/2016 | Romanik ............ G06T 7/33 382/103 |
| 2016/0321814 | A1* | 11/2016 | Zhou ................. G06T 7/74 |
| 2018/0336704 | A1* | 11/2018 | Javan Roshtkhari ..... G06T 7/62 |

FOREIGN PATENT DOCUMENTS

| | | |
|---|---|---|
| EP | 2 084 886 B1 | 9/2012 |
| EP | 1 716 520 B1 | 4/2016 |
| JP | H09245173 A | 9/1997 |
| JP | 2003281504 A | 10/2003 |
| JP | 2004171109 A | 6/2004 |
| JP | 2006245949 A | 9/2006 |
| JP | 2011523146 A | 8/2011 |
| RU | 2422901 C2 | 6/2011 |
| RU | 2013111306 A | 9/2014 |
| WO | 2009149765 A1 | 12/2009 |
| WO | 2012022678 A1 | 2/2012 |

OTHER PUBLICATIONS

Ho, A. et al., "Handbook of Digital Forensics of Multimedia Data and Devices", Wiley, XP055363323, Jan. 1, 2015, pp. 450-455.
Metois, E. et al., "FiberFingerprint Identification", Proceedings of the Workshop on Automatic Identification, XP003017453, Mar. 1, 2000, pp. 147-154.
Clarkson, W. et al., "Fingerprinting Blank Paper using Commodity Scanners", 30th IEEE Symposium on Security and Privacy, XP031515112, May 17, 2009, pp. 301-314.
Sharma, A. et al., "PaperSpeckle: Microscopic Fingerprinting of Paper", Computer and Communications Security, ACM, XP058006044, Oct. 17, 2011, pp. 99-110.
Buchanan J. D. R. et al., "Fingerprinting documents and packaging", Nature, vol. 436, Jul. 28, 2005, pp. 475-510.
Clarkson, W. et al., "Breaking Assumptions: Distinguishing Between Seemingly Identical Items Using Cheap Sensors", Princeton, UMI Dissertation Publishing, Jun. 1, 2012, pp. 1-160.
Evangelidis, G. D. et al., "Parametric Image Alignment using Enhanced Correlation Coefficient Maximization", IEEE Transactions on Pattern Analysis and Matching Intelligence, Oct. 2008, vol. 30, No. 10, 9 pages.
Fischler, M.A. et al., "Random sample consensus: a paradigm for model fitting with applications to image analysis and automated cartography", Communications of the ACM, 1981, vol. 24, No. 6, pp. 381-395.
Wolberg, G. et al., "Image registration for perspective deformation recovery", Proc. SPIE, Apr. 2000, pp. 1-12.
Russian Office Action and Search Report dated Nov. 23, 2020, from corresponding Russian Application No. 2019108714/28, pp. 1-13 (Includes Machine-Generated English Translation).
Japanese Office Action dated Jun. 15, 2021, from corresponding Japanese Application No. 2019-533697, pp. 1-7 (Includes English languageTranslation).

\* cited by examiner

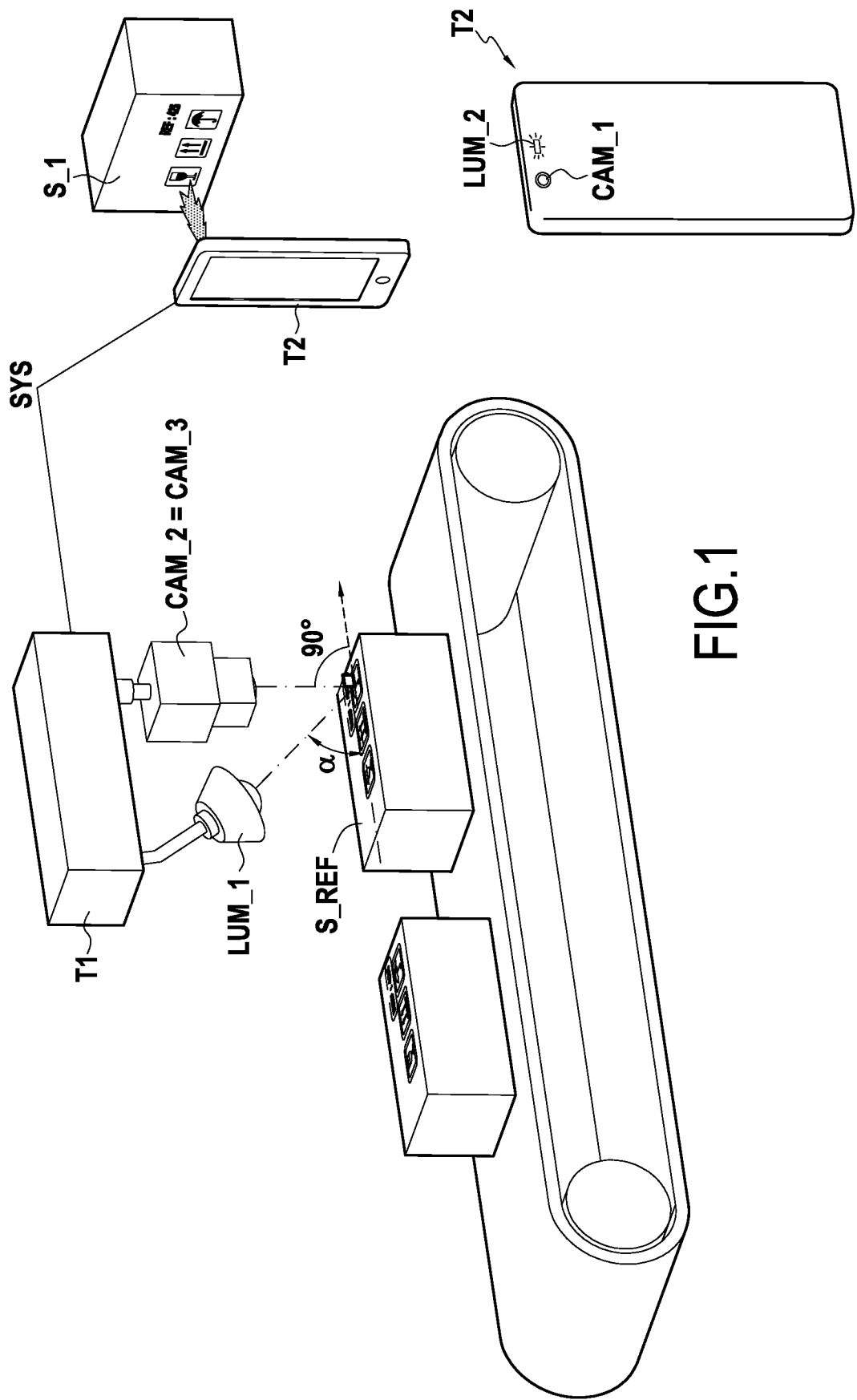

METHOD AND SYSTEM FOR GENERATING A SURFACE SIGNATURE

CROSS-REFERENCE TO RELATED APPLICATIONS

This application is a U.S. National Stage application of International Application No. PCT/FR2017/052307 filed 30 Aug. 2017, which claims priority to French Application No. 1658121 filed 1 Sep. 2016, the entire disclosures of which are hereby incorporated by reference in their entireties.

The present invention lies in the general field of generating a digital signature for a surface of a material element, e.g. in order to authenticate that surface or that material element.

A digital signature of a surface corresponds to a code (e.g. a string of digits and letters) that is generated using an algorithm from structural characteristics of that surface.

The invention relates more particularly to correcting perspective between an image representing a surface of a material element and a model image of a reference surface, in order to extract the digital signature of the material element.

At present, it is possible to extract a digital signature from a surface on the basis of structural characteristics of that surface. By way of example, these structural characteristics are determined by detecting, in an image of the surface, interactions between the surface and a source of light. By way of example, such a method is described in Document EP 1 716 520.

Furthermore, the technology described in Document EP 2 084 886 B1 proposes associating a mobile system that includes a sensor, e.g. a smartphone that includes a camera, with an optical module, e.g. integrated in the shell of the telephone.

That technology makes it possible to acquire a controlled image of a surface (the surface is positioned in a certain manner in the image) and to extract from that image the digital signature of that surface.

The image of the surface is acquired by positioning the assembly made up of the telephone and the shell into contact with the surface so as to control the optical distance between the surface and the sensor of the camera.

During acquisition, the surface is illuminated with a source of light, preferably a source that is inclined relative to the normal to the surface.

Finally, the structural characteristics are obtained by detecting the interaction between the surface and the source of light in the acquired image.

A drawback of that system is that it requires the use of an optical module for controlling the distance between the surface and the sensor that acquires the image, in order to ensure that the surface is positioned in predetermined manner in the image.

The invention seeks to provide a solution that does not present that drawback, and that enables a digital signature to be extracted from a surface by using an image of that surface, the surface being positioned and inclined in arbitrary manner relative to an acquisition plane of the image.

OBJECT AND SUMMARY OF THE INVENTION

Thus, and in a first aspect, the invention provides a method of generating a digital signature of a surface of a material element, referred to as an "examined surface", the method being performed by a data processor system, the method comprising, for each examined surface:

- an obtaining step for obtaining an "offset" image having at least a portion showing said examined surface;
- an obtaining step for obtaining zones of interest in the offset image by a method of putting into correspondence, known as "template matching", the offset image with predetermined "equivalent" zones, the equivalent zones being included in a model image having at least a portion representing a "reference" surface;
- an obtaining step for obtaining a "registered" image by registering the offset image with the model image, the registering being performed by applying a first homography transformation to the offset image, the first homography transformation being obtained from the zones of interest and from the equivalent zones; and
- a generation step for generating a digital signature from the registered image, the digital signature characterizing the structure of the examined surface.

In the meaning of the invention, a surface corresponds to a visible portion (i.e. a defined zone) of a material element (i.e. an object). This material element or object may for example be constituted by a product, e.g. a product that is to be sold, or by its packaging. It may also correspond to a security document, e.g. an identity document, a passport, a bank bill, etc.

The "examined" surface corresponds to a surface of a material element/object. It corresponds to the surface used within the method and thus to the visible surface in the offset image. It may thus form part of a larger surface of the material element.

The "reference" surface corresponds to a surface of a predetermined material element/object. For example, the reference surface corresponds to a surface from which the digital signature has been extracted and stored.

The digital signature of a surface corresponds to a code (e.g. a string of digits and letters) that is generated by means of an algorithm from structural characteristics of the surface.

The digital signature of a surface takes account of (i.e. characterizes) the structure of the surface. It may thus characterize the state of the surface, its internal and/or external morphology, its chemical or physicochemical composition, its color, or indeed variation in any combination of these characteristics as a function of their physical locations on the surface.

Below, the term "digital signature" could be replaced in equivalent manner by the term "signature".

The digital signature may be said to be "generated" by the method, or alternatively it could be said to be "extracted" by the method.

Within the method, an "offset" image of the examined surface is obtained initially. A portion of this image may show the examined surface. Alternatively, the entire image may show the examined surface.

The image is said to be "offset" in that it is preferable to register it prior to being able to generate/extract the signature for the surface that is shown.

An offset image representing a surface may for example correspond to an image of a plane surface, the plane surface occupying a plane inclined relative to the acquisition plane of the image. For example, if the image of a plane surface is acquired with a sensor, it is said to be offset if the optical axis of the sensor forms a non-zero angle with the normal to that surface.

Once the offset image has been obtained, one or more zones of interest are obtained in the image. A zone of interest in an image may correspond to a set of points in the image that are neighboring or even adjacent. For example, a zone of interest may comprise all of the points forming a particular quadrilateral in the image, or a set of points contained in such a quadrilateral.

These zones of interest are obtained from predetermined "equivalent" zones within a "model" image having at least a portion that shows the "reference" surface.

Each zone of interest is obtained by a method of putting an equivalent zone in correspondence with the offset image. Putting into correspondence may be referred to as "image matching" or "template matching", and it may be performed by various image analysis methods, e.g. by a least squares method, or by a cross-correlation method. Putting an equivalent zone in correspondence with the offset image serves in general manner to determine in the offset image a zone that presents characteristics that are similar or close to the characteristics of the equivalent zone. Typically, a zone of interest and its equivalent zone may represent the same object or the same portion of an object in two images acquired at different angles of view.

From the zones of interest in the offset image and from the equivalent zones of the model image, a first homography transformation serving to register the resulting image on the model image is estimated.

This registering corresponds to correlating perspective between the two images, and serves to simulate the fact of taking the examined surface in the offset image and placing it into the same plane and at the same orientation as the plane in which the reference surface of the model image is contained.

By applying this homography transformation to the offset image, a "registered" image is obtained of the examined surface, and it is possible to extract the signature of the surface from that image.

Advantageously, starting from an image showing an inclined surface and that is positioned in arbitrary manner, it is possible to generate a signature for that surface by simulating that surface being oriented in an appropriate plane.

In a particular implementation, the step of obtaining the offset image includes a step of acquiring an "acquired" image, the offset image being obtained from the acquired image.

The acquired image also shows all or part of the examined surface.

In a particular implementation, referred to below as the "first general implementation", the offset image corresponds to the acquired image and the signature is generated in the generation step by analyzing the registered image.

Advantageously, the offset image, corresponding to the acquired image, is registered by image processing (correcting perspective by applying a homography transformation), and it therefore does not require the use of a special optical system in association with an acquisition module acquiring the "acquired" image (first acquisition module in the meaning of the invention) in order to cause the plane of the examined surface to be set on a desired plane, in order to be able to extract the signature therefrom. The image of the examined surface can thus be acquired with the first acquisition module located at an arbitrary distance and with an arbitrary orientation relative to the examined surface.

In a particular implementation, the method includes a prior step of defining equivalent zones in the model image.

In a particular implementation, referred to below as the "second general implementation", the method includes a prior step of acquiring an "oriented" image of the reference surface with a second acquisition module positioned substantially normally relative to the reference surface, wherein the model image is obtained by applying a second predetermined homography transformation to the oriented image.

In this implementation, an "oriented" image is acquired with a second acquisition module having its optical axis positioned substantially on the normal of the reference surface.

Typically, on a production line, acquisition substantially on the normal to the surfaces of products or product packaging is used in repeated manner.

The oriented image is then transformed to simulate acquiring an image of the reference surface in conditions that are different from the conditions of acquiring the oriented image, e.g. with a different angle, in a different orientation, and/or at a different distance.

This transformation corresponds to applying a second homography transformation to the oriented image. The model image is thus obtained, from which the offset image is to be registered.

Advantageously, applying this second homography transformation serves to obtain a model image in which the reference surface presents an inclination and a position that are close to those of the examined surface in the offset image.

This step thus serves to optimize the step of registering the offset image with the model image, e.g. by making it possible to obtain a better estimate of the first homography transformation, or indeed by avoiding obtaining an estimate of this homography transformation that is anomalous.

For example, the oriented image of the reference surface acquired on a production line may be transformed in such a manner as to simulate acquiring an image of this reference surface with a mobile system such as a telephone or a tablet. Thus, if the offset image is also acquired with the mobile system, and thus under conditions of orientation and position relative to the examined surface that are similar or close to those of the model image obtained after transformation, the registering or correcting of perspective between the offset image and the model image is improved.

In a particular implementation of the second general implementation (in which the model image is obtained by applying the second homography transformation to an oriented image), the step of generating the digital signature includes an obtaining step for obtaining a "transformed" image by transforming the registered image by applying thereto the inverse of the second homography transformation, and the signature is generated in the generation step by analyzing the transformed image.

In this implementation, the model image is applied by applying a second homography transformation to the oriented image, and then the offset image is registered with the model image in order to obtain the registered image. Finally, the inverse of this second homography transformation is applied to the registered image in order to obtain the transformed image. The transformed image is thus registered with the oriented image.

The signature is thus extracted from the examined surface by using the transformed image under conditions of position and orientation of this surface that are similar to those in which the reference surface is positioned in the oriented image.

In this implementation, the offset image is registered (correcting its perspective) before applying the inverse of the second homography transformation in order to register the registered image with the oriented image.

Alternatively, still in the context of the second general implementation, the registered image is obtained by applying the inverse homography transformation of the second homography transformation to the acquired image, and the signature is generated in the generation step by analyzing the registered image.

In this implementation, the second homography transformation is also applied to the oriented image, making it possible to obtain the model image, but the inverse of this second homography transformation is applied beforehand to the acquired image in order to obtain the offset image, which is then registered with the model image in order to obtain the registered image.

The signature is thus extracted from the examined surface by using the registered image, but with conditions of position and orientation for this surface that are similar to those in which the reference surface is positioned in the oriented image.

In this implementation, the inverse of the second homography transformation is applied to the acquired image prior to registering that image (correcting its perspective) with the model image.

In a particular implementation, the method includes, for each examined surface, an authentication step for authenticating the examined surface, this authentication step being performed by comparing the generated signature with an authentic digital signature, the authentic signature characterizing the structure of the reference surface.

This authentication may correspond to a method as described in Document EP 1 747 540 B1 or in Document EP 1 971 960 B1.

By comparing the generated signature with an authentic signature, it is possible to determine whether the examined surface and the reference surface present the same structural characteristics.

In this way, it is possible for example to evaluate whether a particular product including the examined surface comes from a production line from which an authentic signature has previously been extracted for one or more surfaces included in one or more products.

In a particular implementation, the method comprises:
in the first general implementation, a prior step of generating an authentic signature from the model image, referred to as "generation of a first type"; or
in a second general implementation, a prior step of generating an authentic signature from the oriented image, referred to as "generation of a second type".

In this example, in the first general implementation, the signature of the examined surface is generated from the registered image and is compared with the signatures of reference surfaces extracted from stored images of products.

In the second general implementation, the signature of the examined surface is generated from the transformed image, or from the registered image if the offset image is obtained by applying the inverse of the second nomography transformation to the acquired image, and it is compared with the signatures of the reference surfaces extracted from the stored oriented images of the products.

In both of these implementations, the signatures are extracted from images that represent surfaces positioned in the same plane and with the same orientation, thereby guaranteeing that the authentication step is valid.

In a particular implementation, the step of generating the authentic signature comprises:
an acquisition step of using a third acquisition module to acquire the reference surface; and
a lighting step, during at least the acquisition step, of illuminating the reference surface with a first source of light;
the acquisition step corresponding to:

acquiring the model image if the generation is of the first type; or
acquiring the oriented image if the generation is of the second type.

If the generation is of the second type, then the third acquisition module corresponds to the second acquisition module.

If lighting is not sufficient in terms of illuminated area for the examined surface, provision is made to increase the effective area of the examined surface and/or of the zone of interest by performing a plurality of steps of obtaining "offset" images. The various steps of obtaining offset images are then performed with the acquisition module and the lighting source moving (e.g. in translation) so as to reconstitute an examined surface and/or the zone of interest of area that is greater.

In a particular implementation, the optical axis of the third module is oriented substantially normally relative to the reference surface, the reference surface is illuminated during the lighting step by the first source with an angle of attack relative to the reference surface corresponding to a grazing angle of incidence.

In a particular implementation, the angle of attack preferably lies in the range 16° to 45°.

In a particular implementation, the method includes a lighting step at least during the acquisition step performed by the first module in which the examined surface is illuminated by a second source of light, and the step of generating the signature includes an obtaining step for obtaining a structural characteristic of the examined surface by detecting interaction between the examined surface and the second source of light, the detection of interaction being performed:
by analyzing the registered image if the generation is of the first type; or
by analyzing the transformed image obtained from the registered image, if the generation is of the second type.

In a particular implementation, the method includes a prior step of generating the authentic signature, referred to as "generation of a third type", the step of generation of the third type comprising:
an acquisition step of an acquisition module acquiring the first model image;
a lighting step during at least the acquisition step of illuminating the reference surface with a source of light, the optical axis of the module and the optical axis of the source having substantially the same orientation relative to the reference surface S_REF, e.g. the same angle of inclination β; and
an analysis step of analyzing a "re-oriented" image, the re-oriented image being obtained by applying a homography transformation compensating the orientation of the acquisition module and of the source of light, e.g. a first rotation of the model image through an angle −β;
wherein the offset image corresponds to the acquired image:
the method including a lighting step, at least during the acquisition step performed by the first module, in which the examined surface is illuminated by a source of light, and wherein the set of generating the signature includes an obtaining step for obtaining a structural characteristic of the examined surface by detecting interaction between the examined surface with the source of light, the optical axis of the module and the source of light being oriented substantially to have the same orientation relative to the examined surface (S_1), e.g. the same angle of inclination β; and the interaction being detected by analyzing a "flattened-out image", the flattened-out image being obtained by a homography transformation compensating the orientation of the acquisition module and of the source of light, e.g. a first rotation of the registered image through an angle −β.

In this implementation, an image of the reference surface is acquired with an acquisition module and a source of light, e.g. oriented at an angle β relative to the reference surface. The model image is thus obtained.

Thereafter, in this example, the model image is turned through an angle −β so as to obtain a re-oriented image that appears as though it were acquired with an acquisition module positioned at 90° relative to the reference surface.

Thereafter, the signature of the reference surface is extracted from this re-oriented image. This signature is said to be an "authentic" signature.

An image of the examined surface is then acquired with an acquisition module and a source of light oriented at an angle substantially equal to β relative to the examined surface. The acquired image is thus obtained.

The acquired image corresponds to the offset image, and it is then registered with the model image so as to obtain the registered image.

Thereafter, the registered image is turned through an angle −β so as to obtain a flattened-out image that appears as though it was acquired with an acquisition module at 90° relative to the examined surface.

Finally, the digital signature of the reference surface is extracted from the flattened-out image.

In a particular implementation, in order to acquire at least two images by the first module, for each of the acquired images, the second source is located in the same position and in the same orientation relative to the first module.

In this implementation, the method may be applied in repeated manner to different examined surfaces with a single moving system having a first acquisition module and a second source of light of positions and orientations that are fixed relative to the system.

For example, the method may be performed by a telephone or a tablet, e.g. including a camera acting as the first acquisition module and a flash acting as the second source of light.

In this implementation, making the method repeatable with a single mobile system is facilitated.

In a particular implementation, the method includes a step of reading protected information, the protected information being subjected in digital form to digital processing that is the inverse of the processing used for protecting the information, the processing making use of the generated signature.

In this implementation, the generated signature is needed in order to be able to read the protected information, and it is thus used as a key for protecting the information, as described in Document EP 1 716 520 B1.

In a particular implementation, the protected information is contained in a visual code arranged on the examined surface or on a product or on a package including the examined surface.

In a particular implementation, the visual code corresponds to a one-dimensional or two-dimensional bar code.

The protected information can thus be contained in the one- or two-dimensional bar code read by a sensor, and using the generated signature for reading this information guarantees that it is protected.

In a particular implementation, the method includes a step of defining "search" zones in the offset image, these search zones including zones of interest, and template matching method is performed on the basis of these search zones.

By way of example, the search zones may be estimated as being:
  located in the offset image at positions close to those of the equivalent zones in the model image; and
  of greater size in the offset image than the zones of interest.

These search zones correspond to zones in which the zones of interest are to be located by the template matching method. They serve to determine a particular perimeter in the offset image, within the zones of interest have a high probability of being located, so as to perform the template matching method more effectively.

In a particular implementation, the template matching method serves, on the basis of a search zone, to obtain a first estimate of parameters for an affine transformation that transforms predetermined points of a zone of interest into corresponding predetermined points of an equivalent zone.

This template matching method is performed for each zone of interest defined in the offset image.

These parameters specific to each pair comprising a zone of interest and an equivalent zone serve to estimate the parameters of the first homography transformation that serves to transform the offset image into the model image.

In a particular implementation, the first estimate is obtained by using a least squares method between the coordinates of the points of the equivalent zone and the coordinates of the points of the search zone including the zone of interest.

Alternatively, the first estimate is obtained by using a cross-correlation method between the coordinates of the points of the equivalent zone, and the coordinates of the points of the search zone.

These two methods correspond to well-known "template matching" methods and they could be replaced by analogous other methods.

In a particular implementation, the template matching method includes an obtaining step for obtaining a second estimate of the parameters, the second estimate being obtained by optimizing the first estimate with an iterative algorithm seeking to maximize a first enhanced correlation coefficient between the equivalent zone and the search zone.

This optimization corresponds to the method described in the document "Parametric image alignment using enhanced correlation coefficient maximization" (Georgios D. Evangelidis and Emmanouil Z. Psarakis) published in October 2008 in the Journal "IEEE transactions on pattern analysis and matching intelligence", Vol. 30, No. 10.

It makes it possible to obtain a more accurate estimate of the homography transformation for registering the offset image with the model image. In particular, it serves to correct possible effects of distortion that might occur in the image during registering.

In a particular implementation, the reference surface constitutes a surface of inclination and position that are known relative to the acquisition plane of said model image.

In a particular implementation, the first homography transformation is obtained by using a random sample consensus (RANSAC) algorithm. By way of example, this algorithm is described in the document by M. A. Fischler and R. C. Bolles, "Random sample consensus: a paradigm for model fitting with applications to image analysis and automated cartography", Communications of the ACM, 24(6), pp. 381-395, 1981.

This algorithm makes it possible to exclude outlier points from the set of points used in the method for estimating the parameters of the first homography transformation.

A better estimate of the parameters of the first homography transformation is thus obtained.

In a particular implementation, the homography transformation is obtained by using an iterative optimization algorithm seeking to maximize a second enhanced correlation coefficient between the offset image and the model image.

This algorithm using this second enhanced correlation coefficient is analogous to the algorithm using the first coefficient as described above, but it is now applied to the context of registering the offset image with the model image instead of when performing template matching of a zone of interest with an equivalent zone.

It makes it possible to obtain an improved estimate for the parameters of the first homography transformation.

In a particular implementation, the homography transformation is obtained from the coordinates of pairs of points, each pair comprising one point in the equivalent zone and another point in a the zone of interest defined by the template matching method between the equivalent zone and the offset image.

In a particular implementation, these points comprise the centers of the zones of interest and of the equivalent zones.

In this implementation, the first homography transformation is thus determined from a set of pairs of points, each pair comprising the center of a zone of interest and the center of the equivalent zone determined by template matching between the zone of interest and the model image.

For example, one possible method for determining the homography transformation could be that used in part 4.2 of the document "Image registration for perspective deformation recovery" (Geaorge Wolberg and Siavash Zokai).

In a particular implementation, the zones of interest are defined around and/or relative to one or more graphics elements present on the examined surface, the graphics element(s) also being present on the reference surface.

The presence of graphics elements serves to facilitate both defining the zones of interest, e.g. by using a method of recognizing these symbols in order to define these zones, and also serves to facilitate the step of registering the offset image with the model image. Specifically, it is preferable when applying an "image matching" or putting-into-correspondence method to make use as inputs of images that present rapid variations (e.g. over about ten pixels) in color and/or brightness.

Preferably, these graphics elements appear in contrasted manner on the examined surface and on the reference surface, thereby further facilitating the template matching method.

In a particular implementation, the digital signature is generated from structural characteristics of the examined surface, the examined surface being constituted by a material element selected from among all or some of: a fiber material, a plastics material, a metal material, leather, wood, a composite material, glass, or a mineral, in particular of crystalline structure.

In a particular implementation, the method of the invention includes a prior step of defining the equivalent zone in the model image.

In a particular implementation, the examined surface includes a symbol, the acquisition step of acquiring the acquired image being triggered automatically as a function of determining an orientation for said first acquisition module relative to the examined surface, said determination being performed from an image of said symbol.

Preferably, the method includes a display step of displaying on a screen of a terminal including said at least one acquisition module, an image of the acquisition field of said first module, in which there is superposed a virtual symbol, and wherein the acquisition step of acquiring the acquired image is triggered automatically as a function of the relative position of the image of said symbol in said acquisition field and the position of said virtual symbol.

More preferably, the acquisition step for acquiring the acquired image is triggered automatically when the image of said symbol in said acquisition field coincides with said virtual symbol.

Advantageously, in this implementation, superposing these two symbols requires the second or third acquisition module to be oriented in a certain manner so the orientation of this acquisition module is controlled.

For example, the symbol may be selected so that the optical axis of the acquisition module is to be oriented at 45° or at 90° relative to the examined surface.

In a second aspect, the invention provides a system for generating a digital signature of an examined surface, the system comprising:
- an obtaining module for obtaining for, each of said examined surfaces, an "offset" image having at least a portion that shows said surface;
- an obtaining module serving to obtain, for each examined surface, zones of interest in the offset image by a template matching method between said first offset image (IM_1) and at least one predetermined "equivalent" zone (ZEQ_1, ZEQ_2, ZEQ_3, ZEQ_4), said at least one equivalent zone being contained in at least one model image (IM_M) having at least a portion showing a reference surface (S_REF);
- a registering module for registering, for each said examined surface, the offset image with said at least one model image, the registering being performed by applying a first homography transformation to the offset image, the homography transformation being obtained from zones of interest and from equivalent zones; and
- a generator module serving, for each examined surface, to generate a digital signature from the registered image, the digital signature characterizing the structure of the examined surface.

In a particular embodiment, the system comprises:
- a first module having a first camera and a first source of light forming an angle of attack relative to the reference surface corresponding to a grazing angle of incidence, the angle of attack preferably lying in the range 16° to 45°, more preferably in the range 16° to 25°, still more preferably in the range 16° to 20°; and/or
- a second module having a communicating terminal, a second camera, and a second source of light.

In a particular embodiment, the communicating terminal is a cell phone or a tablet, the second camera is a camera of the cell phone or of the tablet, and the second source of light is a flash of the portable telephone or of the tablet.

In a third aspect, the invention provides a second method of generating a digital signature of an examined surface, the method comprising, for each examined surface:
- an obtaining step for obtaining a set of offset images, at least a portion of each image showing the examined surface;
- for each offset image:
  - an obtaining step for obtaining zones of interest in the image by a method of template matching said image with predetermined "equivalent" zones, the equivalent zones being contained in a model image having at least a portion showing a reference surface; and an obtaining step for obtaining a registered image by registering the offset image with the model image, the registering being performed by applying a homography transformation to the offset image, the homography transformation being obtained from the zones of interest and from the equivalent zones;

a step of combining the resulting registered images into a "combined" image; and a step of generating a digital signature from the combined image, the digital signature characterizing the structure of the examined surface.

In a particular embodiment, the various steps of the method of generating a digital signature for an examined surface are determined by computer program instructions. Consequently, the invention also provides a computer program on a data medium, the program being suitable for being performed by a computer, the program including instructions adapted to performing the method of generating a signature for an examined surface, as mentioned above.

The program may use any programming language, and be in the form of source code, object code, or code intermediate between source code and object code, such as in a partially compiled form, or in any other desirable form.

The invention also seeks to provides a computer readable data medium including instructions of a computer program as mentioned above.

The data medium may be any entity or system capable of storing the program. For example, the medium may comprise storage means, such as a read only memory (ROM), e.g. a compact disk (CD) ROM, or a microelectronic circuit ROM, or indeed magnetic recording means, e.g. a hard disk.

Furthermore, the data medium may be a transmissible medium such as an electrical or optical signal suitable for being conveyed via an electrical or optical cable, by radio, or by other means. The program of the invention may in particular be downloaded from an Internet type network.

Alternatively, the data medium may be an integrated circuit in which the program is incorporated, the circuit being adapted to execute or to be used in the execution of the method in question.

BRIEF DESCRIPTION OF THE FIGURES

Other characteristics and advantages of the invention appear on reading the following description given with reference to the accompanying drawings, in which:

FIG. 1 shows a system in accordance with the invention for generating a digital signature of an examined surface;

FIG. 2 shows a terminal included in a system in accordance with the invention for generating a digital signature of an examined surface;

DETAILED DESCRIPTION

Figure 3:
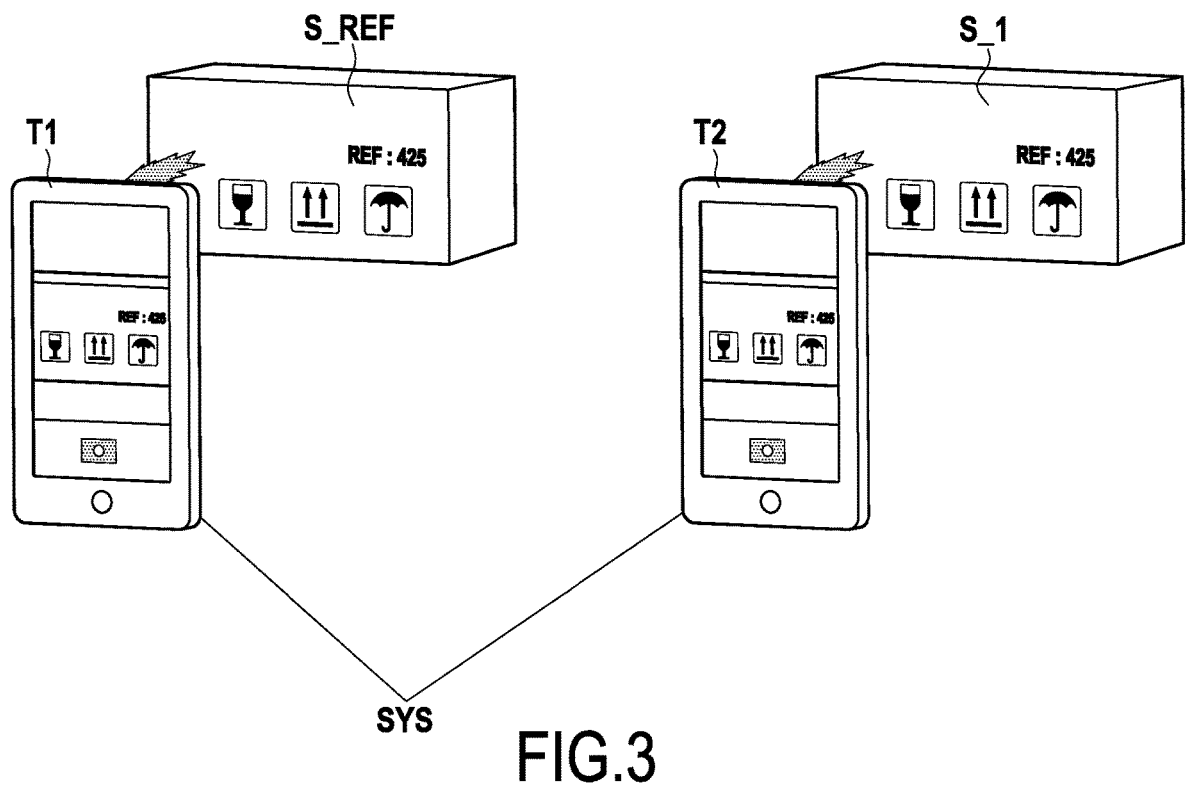
FIGS. 3 and 4 show systems in accordance with the invention for generating a digital signature of an examined surface.
Figure 4:
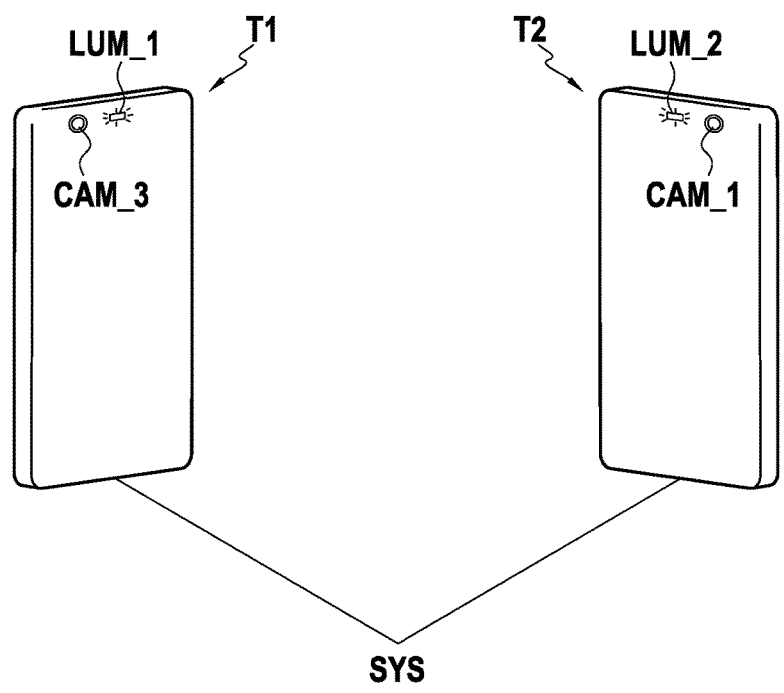

FIG. 1, FIG. 3, and FIG. 4 show a system SYS for generating a digital signature of an examined surface S_1, the system SYS being in accordance with the invention.

In this embodiment, the system SYS may include two terminals T1 and T2 performing the steps of a method in accordance with the invention for generating a digital signature, and as described with reference to FIGS. 5 to 14 and 18 and 19.

In this embodiment, and as shown in FIG. 1, the first terminal T1 is arranged along and in the proximity of a production line for producing a "compliant" product, e.g. a product that is to be sold.

As shown in FIGS. 3 and 4, the terminal T1 may be a mobile terminal, e.g. a smartphone, a telephone, or a tablet.

The terminal T1 has a first source of light LUM_1 for illuminating a visible reference surface S_REF of the compliant product of the packaging of the product. This reference surface S_REF may be constituted by a material selected from all or some of the following: a fiber material, a plastics material, a metal material, leather, wood, a composite material, glass, or a mineral, in particular having a crystalline structure.

This first source LUM_1 may consist in white light, and/or in a flash (e.g. of a telephone or a tablet). The flash may be as shown in FIG. 4.

In accordance with FIG. 1, the angle of incidence of this first source of light LUM_1 on the reference surface S_REF is written □.

In a particular embodiment, this angle of incidence □ corresponds to a grazing angle of incidence, and it preferably lies in the range 16° to 45°, more preferably in the range 16° to 25°, still more preferably in the range 16° to 20°.

In a variant, the terminal T1 does not have a source of light. Under such circumstances, the reference surface S_REF may be illuminated by a source of light that is external to the terminal T1, or indeed external to the system SYS.

The terminal T1 also has an acquisition module, referred to below as the "third" acquisition module CAM_3, and serving to acquire an image in which at least a portion shows the reference surface S_REF.

This image is acquired while the reference surface S_REF is illuminated by the first source LUM_1 or by any other source of light.

This third acquisition module CAM_3 may comprise a still or motion picture camera, or any sensor.

In a particular embodiment and as shown in FIG. 1, the third acquisition module CAM_3 is positioned substantially normal to the reference surface S_REF.

In a particular embodiment and as shown in FIG. 3, the third acquisition module CAM_3 is situated in the same position and in the same orientation relative to the first source of light LUM_1.

This embodiment typically corresponds to the situation in which the terminal T1 is a telephone or a tablet having a flash and a camera, as shown in FIG. 4.

The terminal T1 may also include a module (not shown) that makes it possible to extract an "authentic" signature from the image acquired by the third acquisition module CAM_3 (and representing the reference surface S_REF), which signature characterizes the structure of the reference surface S_REF.

In a particular embodiment, this module serves to obtain one or more structural characteristics of the reference surface S_REF by detecting interaction between the reference surface S_REF and the first source of light LUM_1.

This reference surface S_REF may be constituted by a material embodiment selected from all or some of the following: a fiber material, a plastics material, a metal material, leather, wood, a composite material, glass, or a mineral, in particular having a crystalline structure.

The way this authentic signature is extracted is described in detail with reference to FIGS. 5 to 14, and 18 and 19.

The authentic signature of this reference surface S_REF serves more generally to characterize the compliant product or the packaging of the compliant product formed in part by this surface S_REF.

Alternatively, this module, which is included in the system SYS, is dissociated from the terminal T1.

The system SYS also has a second terminal T2 that may be distinct from the first terminal T1, as shown in FIGS. 1 to 4.

The terminal T2 may consist in a mobile system, e.g. a smartphone, a telephone, or a tablet.

This second terminal T2 has a first acquisition module CAM_1 that can be used for acquiring an image of an "examined" surface S_1, the surface S_1 being on a "candidate" product or on the packaging of the candidate product.

Like the reference surface S_REF, this examined surface S_1 may be constituted by a material element selected from all or some of the following: a fiber material, a plastics material, a metal material, leather, wood, a composite material, glass, or a mineral, in particular having a crystalline structure.

The first acquisition module CAM_1 may be a still or motion picture camera, or any sensor, and it is shown in FIGS. 2 and 4.

The second terminal T2 may also have a second source of light LUM_2, shown in FIGS. 2 and 4.

This second source of light LUM_2 may comprise white light, and/or a flash (e.g. of a telephone or a tablet).

Figure 25:
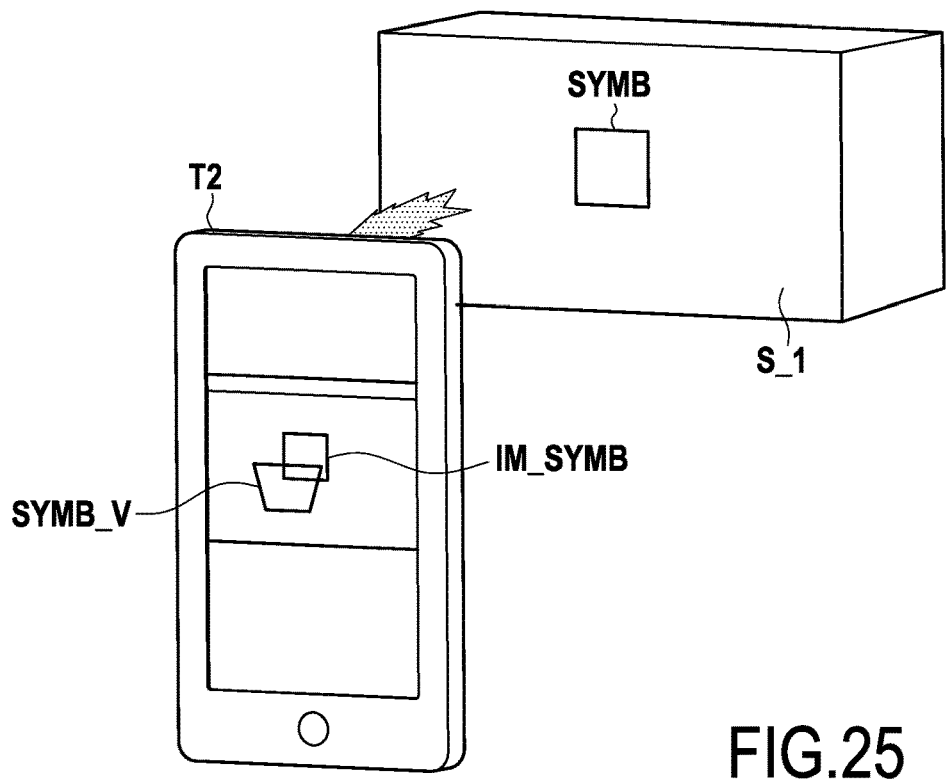
FIG. 25 shows a terminal included in a system in accordance with the invention for generating a digital signature of an examined surface.

The terminal T2 may also include a screen, as shown in FIG. 25, the screen serving to display an image of the field of acquisition of the first acquisition module CAM_1, having superposed thereon a virtual symbol SYMB_V, e.g. corresponding to the outline of the symbol.

In a particular embodiment, the terminal T2 also has a module (not shown) serving to extract a "generated" signature from the image acquired by the first acquisition module CAM_1 (representing the examined surface S_1), which generated signature characterizes the structure of the examined surface S_1.

In a particular embodiment, this module serves to obtain one or more structural characteristics of the examined surface S_1 by detecting interaction between the examined surface S_1 and the second source of light LUM_2.

The way this signature is generated is described in detail with reference to FIGS. 5 to 14, 18 and 19.

The generated signature for this examined surface S_1 serves in more general manner to characterize the candidate product or the packaging of the candidate product for which the surface S_1 forms a part.

Alternatively, this module included in the system SYS is dissociated from the terminal T2.

In a particular embodiment, the generated signature of the examined surface S_1 of the candidate product is compared with the authentic signature of the reference surface S_REF of the complaint product, during an authentication step.

By way of example, this comparison may be performed by a module included in the terminal T1, by a module included in the terminal T2, or by an external module that is distinct from both of these two terminals.

Under such circumstances, and by way of example, the external module may include a communications submodule enabling it to communicate with the terminals T1 and T2 in order to recover the generated signature and the authentic signature.

By means of this comparison, and by way of example, it is possible to estimate that a candidate product has indeed come from a particular production line if the signature generated for the examined surface S_1 of the candidate product is substantially identical to the authentic signature for the reference surface S_REF of the complaint product.

In a particular embodiment, the system SYS includes only the terminal T2.

First General Implementation

Figure 5:
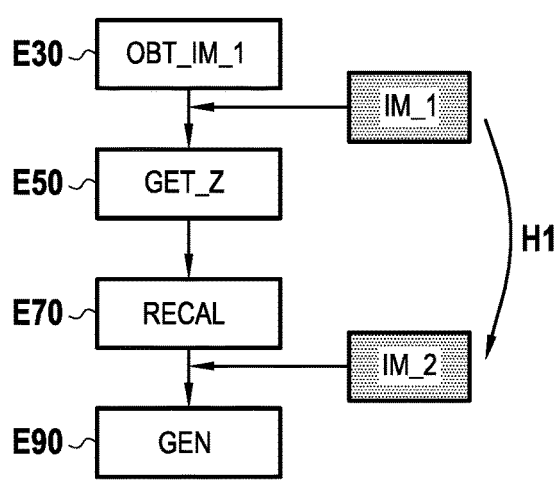
FIGS. 5 to 14 show steps of a method in a first general implementation of the invention for generating a digital signature of an examined surface.

FIG. 5 shows the main steps of a method of generating a digital signature of an examined surface S_1, this method being in accordance with a first general implementation of the invention.

This method has four steps E30, E50, E70, and E90 that can be performed by a system as shown in FIGS. 1, 3, 4, and 22-24.

Figure 22:
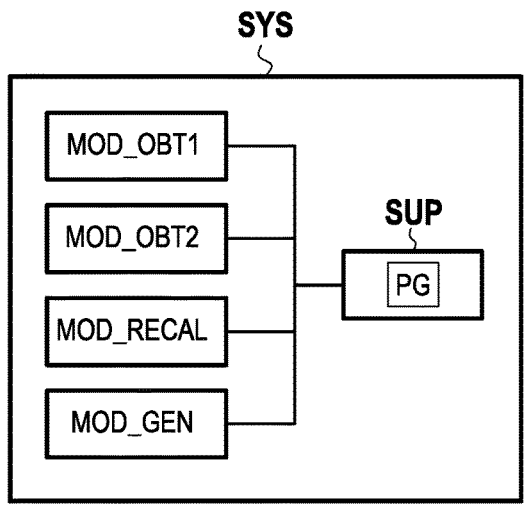
FIGS. 22 to 24 show systems in accordance with the invention for generating a digital signature of an examined surface.

An "offset" image IM_1 is obtained during a step D30 by a module MOD_OBT1 of the system SYS, as shown in FIG. 22.

Figure 23:
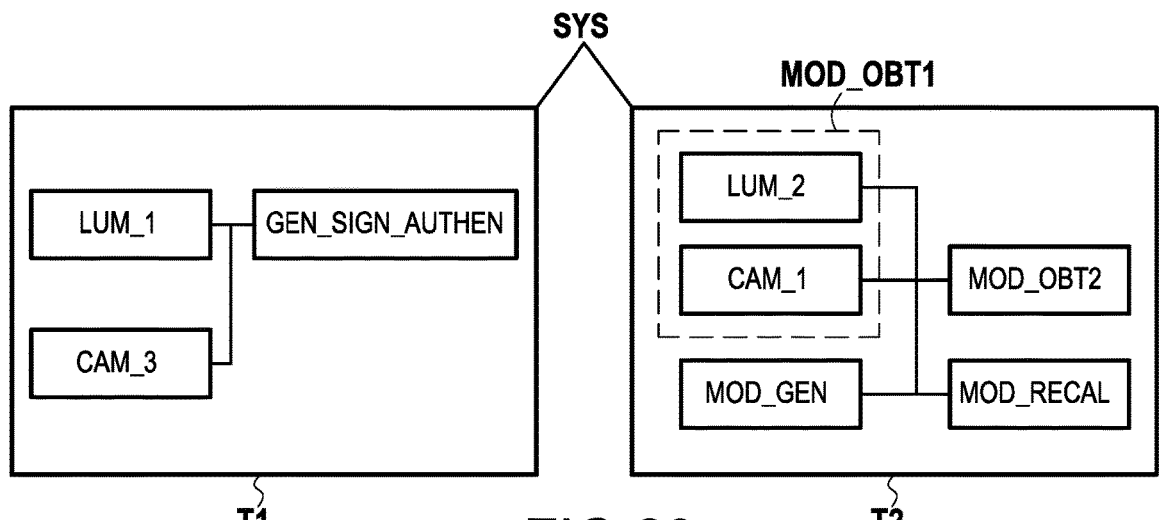

This module MOD_OBT1 may be included in the terminal T2 of the system SYS, as shown in FIG. 23.

In a particular implementation, a portion of this offset image IM_1 shows the examined surface S_1.

In a variant, the entire offset image IM_1 shows the examined surface S_1.

Figure 15:
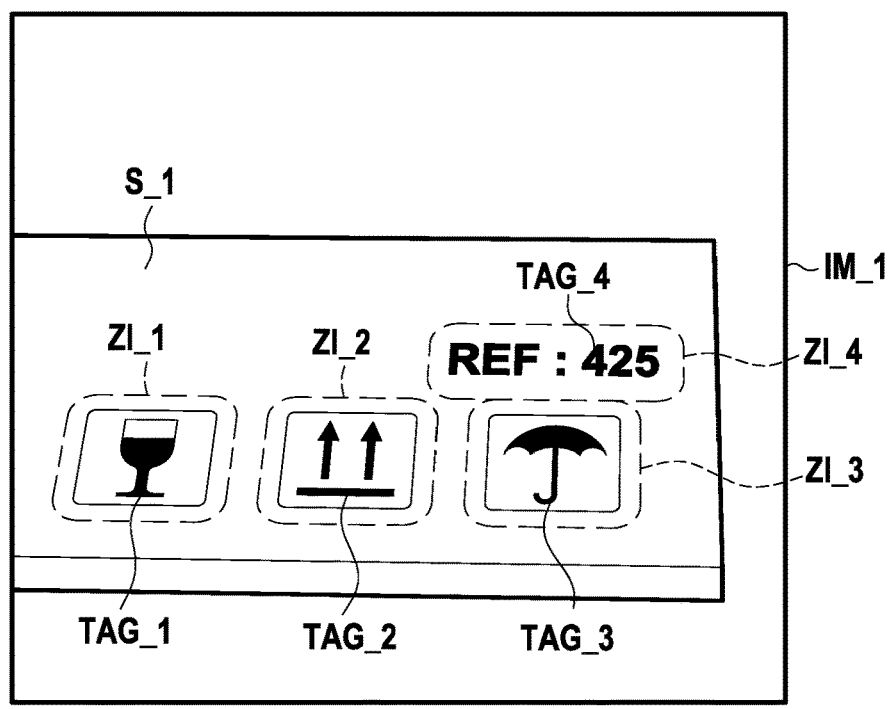
FIG. 15 shows an example in accordance with the invention of an "offset" image of a reference surface.

This image IM_1 may be as shown in FIG. 15.

Figure 6:
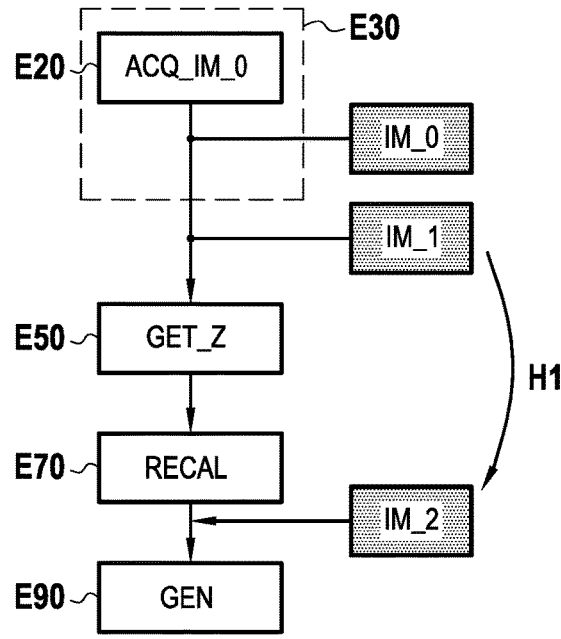

In a particular implementation and in accordance with FIG. 6, the step E30 of obtaining the offset image IM_1 includes an acquisition step E20 of acquiring an "acquired" image IM_0 by means of the first acquisition module CAM_1 shown in FIGS. 1 to 4.

The obtaining module MOD_OBT1 then includes the first acquisition module CAM_1, as shown in FIG. 23.

In this first general implementation, the acquired image IM_0 corresponds to the offset image IM_1 (referred to below as the "offset image IM_1").

As explained above, the terminal T2 may include a screen, as shown in FIG. 25, serving to display an image of the acquisition field of the first acquisition module CAM_1 having superposed thereon a virtual symbol SYMB_V.

Under such circumstances, the surface S_1 may include a symbol SYMB and the acquisition step E20 of acquiring the acquired image IM_0 is triggered automatically when the image IM_SYMB of said symbol SYMB in the acquisition field coincides with the virtual symbol SYMB_V.

Figure 7:
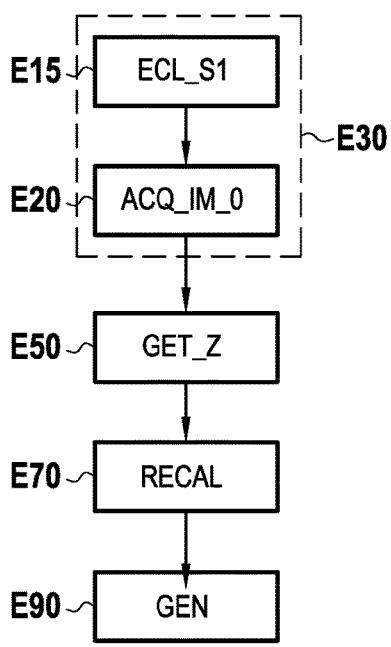

In a particular implementation, and as shown in FIG. 7, the step E30 also includes a step E15 of using the second source LUM_2 to illuminate the examined surface S_1, this illumination being performed at least during the acquisition step E20.

The obtaining module MOD_OBT1 then has a second source LUM_2, as shown in FIG. 23.

Figure 8:
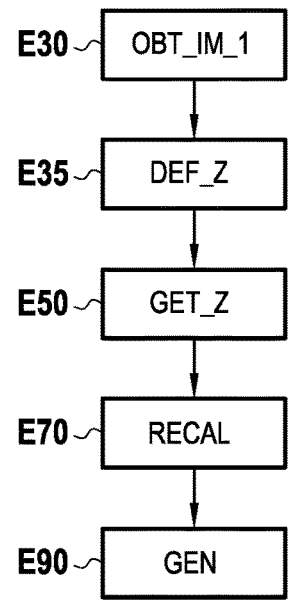

In a particular implementation and in accordance with FIG. 8, the method has a step E35 of defining equivalent zones ZEQ_1, ZEQ_2, ZEQ_3, and ZEQ_4 in a model image IM_M, in which at least a portion shows the reference surface S_REF.

This step is followed by a step E50 of obtaining zones of interest ZI_1, ZI_2, ZI_3, and ZI_4 in the offset image IM_1, as shown in FIG. 15.

These zones of interest are obtained by a method of putting the offset image IM_1 into correspondence with predetermined "equivalent" zones ZEQ_1, ZEQ_2, ZEQ_3, and ZEQ_4 by using template matching, these equivalent zones being contained in one of the model images IM_M.

This step E50 may be performed by a module MOD_DEF of the system SYS, as shown in FIG. 22. This model MOD_DEF may also be included in the terminal T2, as shown in FIG. 23. In a variant, this step may be performed by a module external to the terminal T2.

In a particular implementation, these zones of interest ZI_1, ZI_2, ZI_3, and ZI_4 are positioned around and/or relative to one or more graphics elements TAG_1, TAG_2, TAG_3, and TAG_4 present on the examined surface S_1, e.g. as shown in FIG. 15.

Preferably, this or these graphics element(s) TAG_1, TAG_2, TAG_3, and TAG_4 are contrasted relative to the background color of the examined surface S_1.

Preferably, these graphics elements TAG_1, TAG_2, TAG_3, and TAG_4 are of different shapes.

In a particular implementation, the step E50 is preceded by a step of defining "search" zones in the offset image IM_1 (not shown), these search zones including the zones of interest ZI_1, ZI_2, ZI_3, and ZI_4, and the template matching method is performed from the search zones.

By way of example, these search zones may be defined as follows:
being located in the offset image IM_1 at positions close to the positions of these zones of interest ZI_1, ZI_2, ZI_3, and ZI_4; and
of sizes in the offset image IM_1 that are larger than the zones of interest ZI_1, ZI_2, ZI_3, and ZI_4.

The search zones thus correspond to zones in which the zones of interest ZI_1, ZI_2, ZI_3, and ZI_4 are to be located by the template matching method. They make it possible to define a particular perimeter in the offset image IM_1, in which the zones of interest ZI_1, ZI_2, ZI_3, and ZI_4 have greater probability of being found, in order to perform the template matching method more effectively.

The step E50 is followed by a step E70 of obtaining a "registered" image IM_2 by registering the offset image IM_1 with a "model" image IM_M.

This registering step E70 may be performed by a module MOD_RECAL of the system SYS, as shown in FIG. 22.

It may also be included in the terminal T2, as shown in FIG. 23. In a variant, this module MOD_RECAL is external to the terminal T2.

In a particular implementation, a portion of this model image IM_M shows the reference surface S_REF. In a variant, the entire model image IM_M shows the reference surface S_REF.

Figure 16:
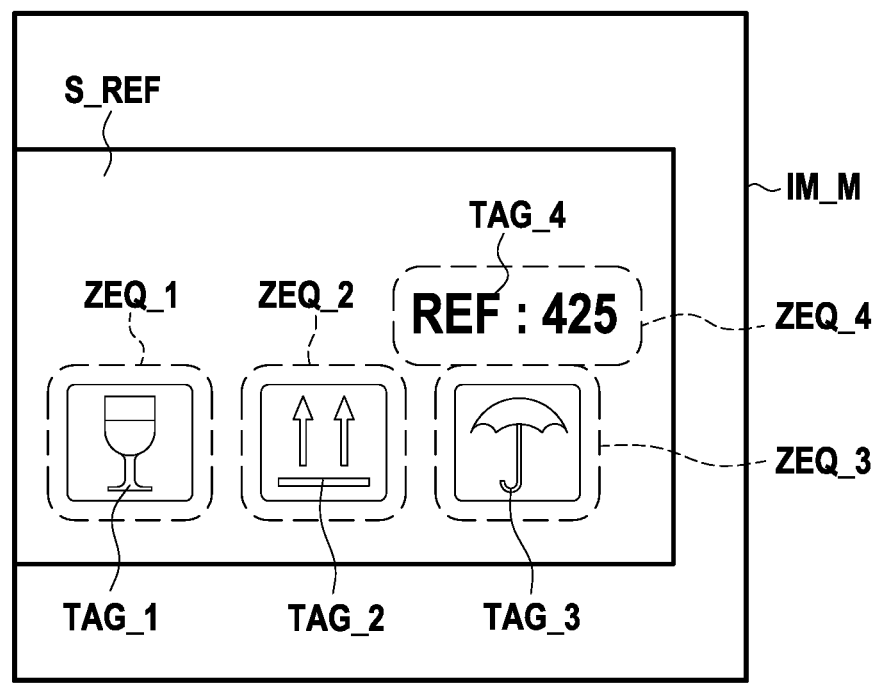
FIG. 16 shows an example in accordance with the invention of a "registered" image of a reference surface.

This model image IM_M may be as shown in FIG. 16.

Figure 9:
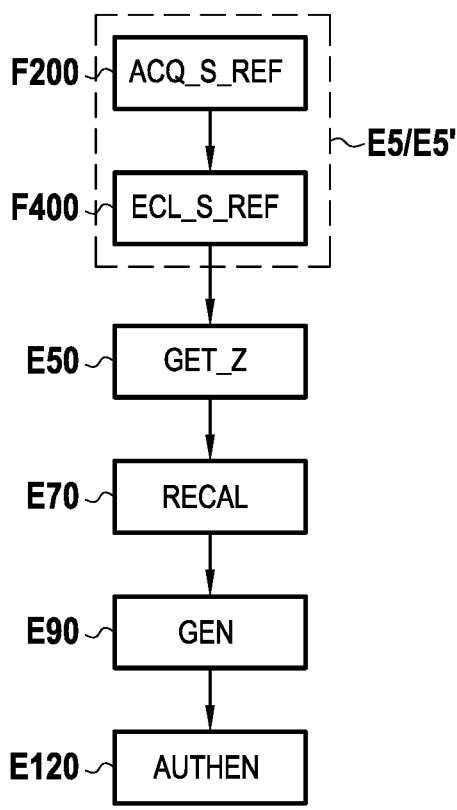

In this first general implementation, and in accordance with FIG. 9, the model image IM_M corresponds to the image of the surface S_REF as acquired by the third acquisition module CAM_3, during a step F200.

In a preferred implementation, the optical axis of the third acquisition module CAM_3 is oriented substantially normally relative to the reference surface S_REF.

By way of example, this implementation corresponds to potentially acquiring the reference surface S_REF of a product or of packaging of that product along a line for producing the product.

In a particular implementation, and still with reference to FIG. 9, the surface S_REF is illuminated during a step F400 by the source of light LUM_1 at least during the acquisition step F200 at an angle of attack □ relative to the reference surface S_REF.

In a particular implementation, this angle □ corresponds to a grazing angle of incidence.

In a particular implementation, this angle □ preferably lies in the range 16° to 45°, more preferably in the range 16° to 25°, still more preferably in the range 16° to 20°.

In a particular implementation, the reference surface S_REF includes the graphics TAG_1, TAG_2, TAG_3, and TAG_4, as shown in FIG. 16.

Registering the offset image IM_1 with the model image IM_M corresponds to correcting perspective between these two images, and serves to simulate the fact of replacing the examined surface S_1 of the offset image IM_1 in the same plane and in the same orientation as the plane in which the reference surface S_REF of the model image IM_M is to be found.

This registering or this obtaining of the registered image IM_2 is performed by applying a first homography transformation H1 to the offset image IM_1.

The first homography transformation H1 is obtained from the zones of interest ZI_1, ZI_2, ZI_3, and ZI_4 lying in the offset image IM_1, and from the equivalent zones ZEQ_1, ZEQ_2, ZEQ_3, and ZEQ_4 of the model image IM_M, as shown in FIG. 16.

In a particular implementation, the template matching method serves to obtain, from a search zone, a first estimate of the parameters of an affine transformation T transforming predetermined points of the zone of interest ZI_1 into corresponding predetermined points of the equivalent zone ZEQ_1.

By way of example, this estimate may be obtained by using a least squares method, or a cross-correlation method, between the coordinates of the points of the equivalent zone ZI_1 and the coordinates of the points of the search zone.

The cross-correlation method may be defined as seeking to maximize, for a plurality of points (x,y) within the search zone of the model image IM_M, the normalized cross-correlation coefficient as defined as follows:

$$R(x, y) = \frac{\sum_{x',y'} [T'(x', y') \cdot I'(x+x', y+y')]}{\sqrt{\sum_{x',y'} T'(x', y')^2 \cdot \sum_{x',y'} I'(x+x', y+y')^2}} \text{ with}$$

$$T'(x', y') = T(x', y') - 1/(w \cdot h) \cdot \sum_{x'', y''} T(x, y)$$

$$I'(x + x', y + y') = I(x + x', y + y') - 1/(w \cdot h) \cdot \sum_{x'', y''} I(x + x'', y + y'')$$

and with:
- I is the search zone in the offset image IM_1;
- T is the zone of interest ZI_1 in the model image IM_M; and
- w and h are the dimensions of T.

This estimate may also be obtained using other known image matching or image template methods.

Figure 10:
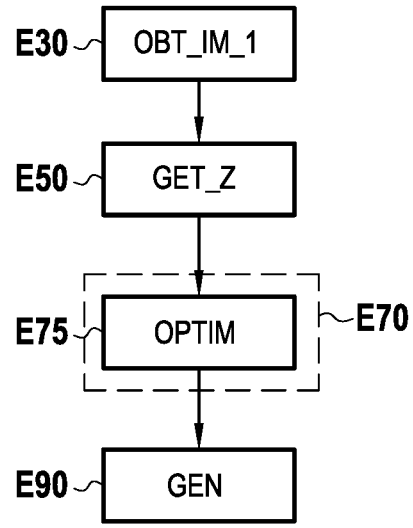

In a particular implementation and in accordance with FIG. 10, the template matching method has a step E75 of obtaining a second estimate of the parameters of the affine transformation, this second estimate being obtained by optimizing the first estimate using an iterative algorithm seeking to maximize a first enhanced correlation coefficient between the equivalent zone ZEQ_1 and the search zone including the zone of interest ZI_1.

This first enhanced correlation coefficient may be defined in the same manner as in section 3.1 of the above-cited document "Parametric image alignment using enhanced correlation coefficient maximization".

Once the parameters of each of the affine transformations transforming each zone of interest ZI_1 into an equivalent zone ZEQ_1 have been estimated, a set of pairs of points is obtained, each pair comprising one point lying in an equivalent zone ZEQ_1 and another point lying in the zone of interest Z_I1 defined by the template matching method applied to the equivalent zone ZI_1 and the inclined image IM_1.

In a particular implementation, the pairs of points comprise the centers of the zones of interest ZI_1, ZI_2, ZI_3, and ZI_4, and the centers of the equivalent zones ZEQ_1, ZEQ_2, ZEQ_3, and ZEQ_4, or they correspond thereto.

The parameters of the first homography transformation H1 transforming the offset image IM_1 into the registered image IM_2 can then be estimated from these pairs of points.

For example, these parameters may be estimated by a method such as a method described in part 4.2 of the document "Image registration for perspective deformation recovery" (Geaorge Wolberg and Siavash Zokai).

In a particular implementation, the first homography transformation H1 is obtained by using the random sample consensus (RANSAC) algorithm.

That algorithm serves to exclude outlier points from the set of points or pairs of points used for estimating the parameters of the first homography transformation H1.

In a particular implementation, the first homography transformation H1 is also obtained by using an iterative optimization algorithm seeking to maximize a second enhanced correlation coefficient between the offset image IM_1 and the model image IM_M.

This algorithm using this second improved correlation coefficient is analogous to the above-described algorithm using the first enhanced correlation coefficient, but it is now applied in the context of registering the offset image relative to the model image, and no longer to putting an equivalent zone ZI_1 into correspondence with the model image IM_M (template matching).

The step E70 of obtaining the registered image IM_2 is followed by a generation step E90 for generating the digital signature from the registered image IM_2, the digital signature characterizing the structure of the examined surface S_1.

Figure 14:
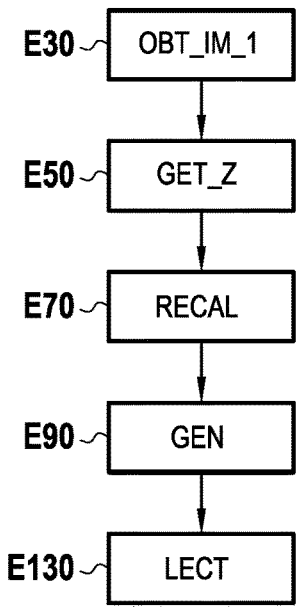

This generation step E90 is performed by a module MOD_GEN, e.g. included in the terminal T2 as shown in FIG. 14, or external to the terminal T2.

Figure 11:
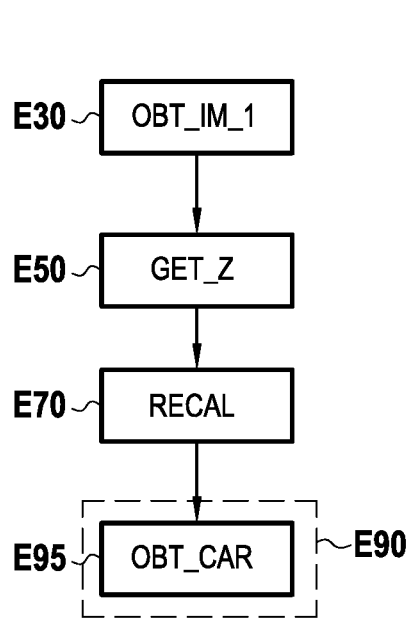

In a particular implementation, and in accordance with FIG. 11, the step E90 of generating the digital signature includes a step E95 of obtaining a structural characteristic of the examined surface S_1 by detecting interactions between the examined surface S_1 and the second source of light LUM_2.

In this first general implementation, interaction is detected by analyzing the registered image IM_2.

Figure 12:
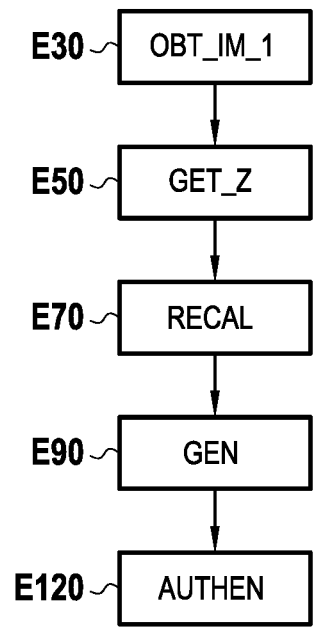

In a particular implementation and in accordance with FIG. 12, the step E90 of generating the generated signature is followed by a step E120 of authenticating the examined surface S_1 by comparing the generated signature with an authentic digital signature, this authentic signature characterizing the structure of the reference surface S_REF.

Figure 13:
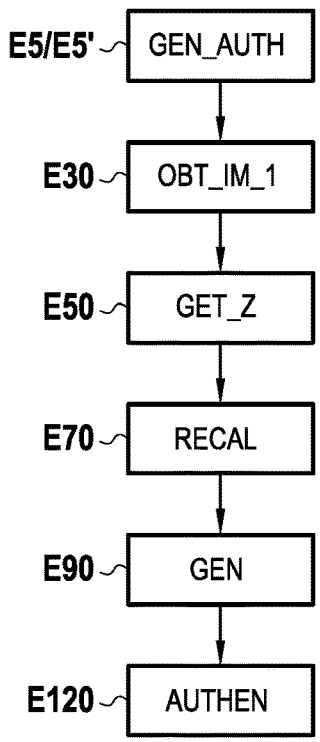

In this first general implementation, the authentic signature is generated during a step E5 from the model image IM_M, as shown in FIG. 13.

More precisely, generating this authentic signature includes obtaining a structural characteristic of the reference surface S_REF by detecting interaction between the reference surface S_REF and the first source of light LUM_1.

In a particular implementation, and in accordance with FIG. 14, the method also includes a step E130 of reading protected information, e.g. information contained in a visual code (not shown) arranged on the examined surface or on a product or a package that includes the examined surface.

While reading the protected information, that information is subjected in digital form to digital processing that is the inverse of the processing used for protecting it, the processing making use of the generated signature. By way of example, the protected information may be contained in a one-dimensional or two-dimensional bar code.

Figure 17:
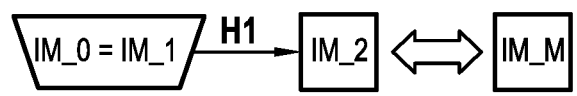
FIG. 17 is a diagram summarizing the various transformations applied to the images involved in the first general implementation.

FIG. 17 summarizes the main steps of the first general implementation: an offset image IM_1 of an examined surface S_1 is obtained that corresponds to an image IM_0 acquired by the acquisition module CAM_3. Thereafter, the image IM_1 is registered relative to the model image IM_M showing the reference surface S_REF so as to obtain the registered image IM_2. The digital signature of this registered image is then extracted. In this example, the double-headed arrow represents the link between two images that show surfaces that are both oriented and positioned in the same manner.

Second General Implementation

Figure 19:
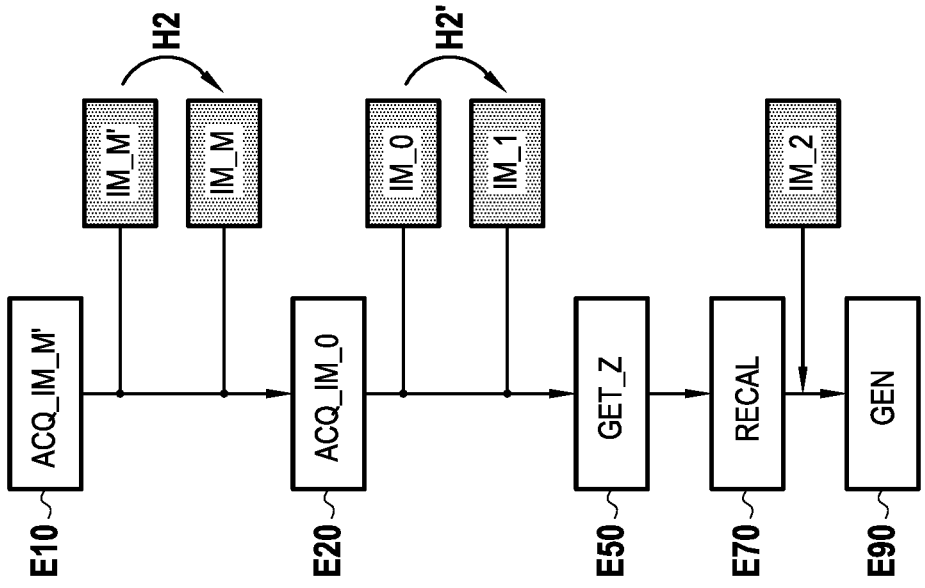
FIGS. 18 and 19 show the steps of a method in a second general implementation of the invention for generating a digital signature of an examined surface.
Figure 18:
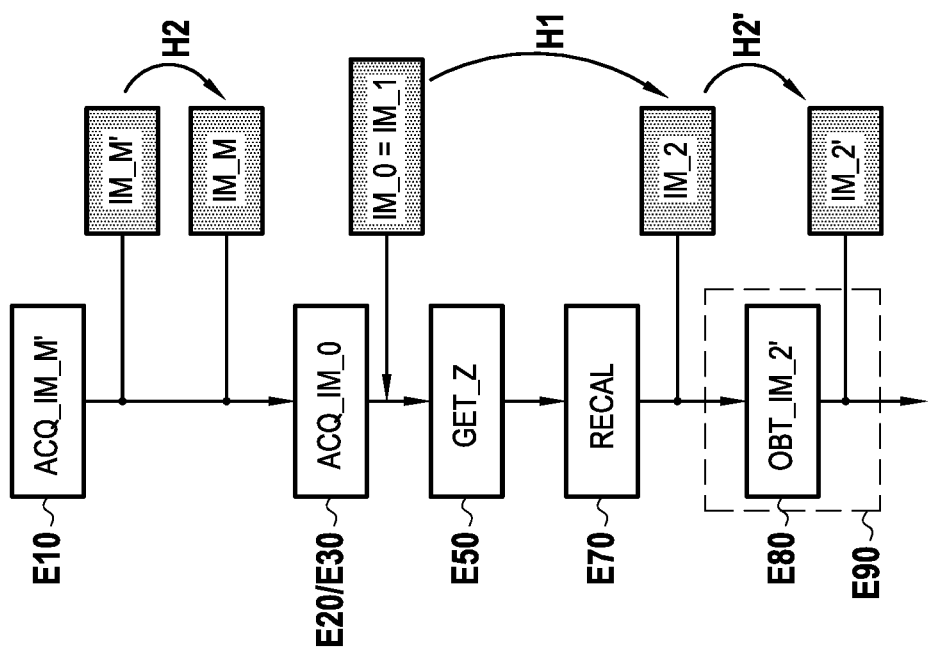

FIGS. 18 and 19 show methods of generating a digital signature of an examined surface S_1, these methods being in accordance with a second general implementation of the invention.

These two methods reproduce the four main steps E30, E50, E70, and E90 of the first general implementation, and they can equally well be performed by a system of the kind shown in FIGS. 1, 3, 4, and 22-24.

They also include the optional steps E15, E60, E75, E95, E120, and E130 of the first general implementation.

As in the first general implementation, the step E30 of obtaining the offset image IM_1 includes a step E20 of acquiring an "acquired" image IM_0 by using the first acquisition module CAM_1, shown in FIGS. 1 to 4.

Nevertheless, in this second general implementation, the model image IM_M is obtained by applying a second homography transformation H2 to an "oriented" image IM_M' showing the reference surface S_REF.

With reference to FIG. 13, this oriented image IM_M' is generated during a step E5'.

With reference to FIG. 9, this oriented image IM_M' is acquired during a step F200 using a second acquisition module CAM_2 positioned substantially normally relative to the reference surface S_REF. A lighting step F400 analogous to the first implementation is performed, at least during the acquisition step F200.

The second homography transformation H2 is preferably selected in such a manner as to transform the oriented image IM_M' into an image of the reference surface S_REF that is simulated as being acquired under particular conditions, e.g. by a telephone or a tablet.

This transformation also serves to "shift" the reference surface S_REF in the model image IM_M into a position and an orientation that are as close as possible to the position and the orientation of the acquired image IM_0.

In a first variant of this second implementation and in accordance with FIG. 18, the offset image IM_1 corresponds to the acquired image IM_0.

Zones of interest are then obtained in the offset image IM_1 during a step E50, and then the offset image IM_1 is transformed during a step E70 into a registered image IM_2 by using these zones of interest.

The various steps for registering the image IM_1 are performed in analogous manner to the first general implementation.

Once the registered image IM_2 has been obtained, during a step E80, the inverse of the second homography transformation H2, written H2', is then applied thereto so as to register it with the oriented image IM_M'. This produces a "transformed" image IM_2'.

During the step E90, the digital signature of the surface S_1 is then generated from the transformed image IM_2'.

In a second variant of the second implementation, and as shown in FIG. 19, the offset image IM_1 is initially obtained by applying the homography transformation H2' to the acquired image IM_0, and it is then registered relative to the oriented image IM_M'.

In this variant, the homography transformation H2' is initially applied to the acquired image IM_0 in order to obtain an image that is then registered on the model image IM_M, unlike the preceding variant in which the acquired image IM_0=IM_1 is initially registered in order to obtain an image that is subsequently registered relative to the oriented image IM_M'.

Thereafter, during the step E90, the digital signature of the examined surface S_1 is generated from the registered image IM_2.

Figure 20:
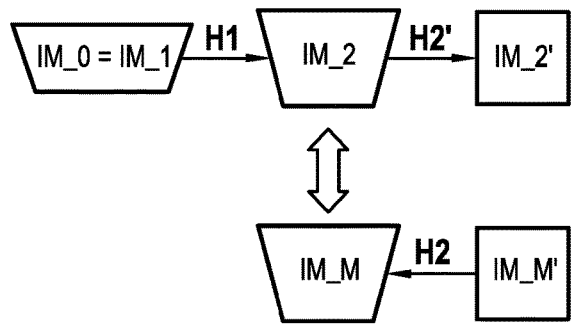
FIGS. 20 and 21 are diagrams summarizing two variants of different transformations applied to the images involved in the second general implementation.

FIG. 20 summarizes the first variant of this second implementation: an offset image IM_1 of an examined surface S_1 is obtained that corresponds to an image IM_0 acquired by the acquisition module CAM_3. Thereafter, the image IM_1 is registered relative to the model image IM_M showing the reference surface S_REF so as to obtain the registered image IM_2, the model image IM_M having already been obtained after transforming the oriented image IM_M' by applying thereto the homography transformation H2. The inverse of the homography transformation H2, written H2', is then applied to the registered image IM_2 in order to obtain the transformed image IM_2' from which the signature is extracted.

Figure 21:
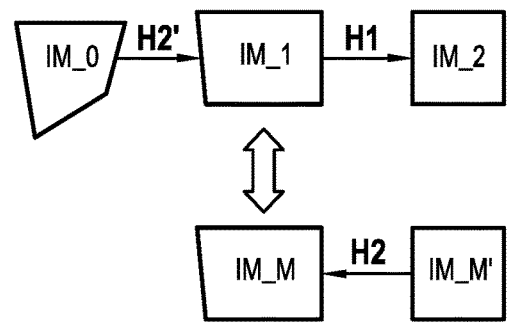

FIG. 21 summarizes the second variant of this second implementation: an offset image IM_1 of an examined surface S_1 is obtained by applying the homography transformation H2' to an image IM_0 acquired by the acquisition module CAM_3. Thereafter, the image IM_1 is registered relative to the oriented image IM_M' showing the reference surface S_REF so as to obtain the registered image IM_2, the model image IM_M being already obtained by transforming the oriented image IM_M' by applying the homography transformation H2 thereto. The signature is then extracted by analyzing the registered image IM_2.

Third Implementation

The method in a third implementation reproduces the four main steps E30, E50, E70, and E90 of the first and second general implementations.

As in the first and second general implementations, the step E30 of obtaining the offset image IM_1 includes a step E20 of acquiring an "acquired" image IM_0 by the acquisition module.

In this third general implementation, the acquired image IM_0 corresponds to the offset image IM_1 (referred to below as the "offset image IM_1").

Zones of interest are obtained in the offset image IM_1 during a step E50, and then the offset image IM_1 is transformed during a step E70 into a registered image IM_2, on the basis of those zones of interest.

The various steps enabling the image IM_1 to be registered are performed in a manner analogous to the first general implementation: the registered image IM_2 is obtained by applying the first homography transformation H1 to the offset image IM_1 by an above-described method of template matching applied to predetermined points of zones of interest in the offset image IM_1 relative to those mentioned in the model image IM_M.

Nevertheless, this third implementation differs from the first two in the arrangement of the acquisition modules for acquiring the model image and the offset image, in the arrangement of the sources of light, and also in the way these signatures are extracted.

In this implementation, the model image IM_M of the reference surface S_REF is acquired by an acquisition module and a source of light having the same orientation relative to the reference surface S_REF, e.g. the same angle of inclination $\beta$, other than 90°, relative to the reference surface. This angle of inclination of the acquisition module and of the source of light avoids a light halo being formed.

This third implementation is thus particularly advantageous for specular or glossy surfaces where lighting at 90° forms a halo of light that reduces contrast and affects signature extraction.

Thereafter, a first homography transformation is performed in order to compensate for the orientation of the acquisition module and of the source of light, in such a manner as to obtain a re-oriented image that appears as though it had been acquired with an acquisition module positioned at 90° relative to the reference surface S_REF. By way of example, this homography transformation comprises rotating the model image IM_M through an angle of $-\square$, possibly in combination with a first homography transformation H1 as described above in the other implementation.

Thereafter, the authentic signature of the reference surface S_REF is extracted from the re-oriented image.

Furthermore, the offset image of the examined surface is acquired with an acquisition module and a source of light that are oriented at an angle $\square'$ relative to the examined surface S_1, the angles $\square$ and $\square'$ preferably being similar.

By way of example, this angle $\square'$ is determined by causing the symbols SYMB_V and SYMB described above with reference to FIG. 25 into coincidence, or by using any other means serving to guarantee the orientation of the acquisition module relative to the examined surface at the time of acquisition. This mechanism seeking to guarantee the orientation of the acquisition module can be used in the other implementations of the invention. As explained above, the offset image is registered with the model image so as to obtain the registered image.

A homography transformation is then performed to compensate the orientation of the acquisition module and of the source of light so as to obtain an image that is returned to being flattened out so that it appears as if it was acquired with an acquisition module positioned at 90° to the examined surface. By way of example, this homography transformation comprises rotating the registered image through an angle of $-\beta'$, possibly together with performing a first homography transformation H1 as described above for the implementations.

Finally, during the step E90, the digital signature of the surface S_1 is then generated, using the image as flattened out.

Fourth Implementation

Figure 26:
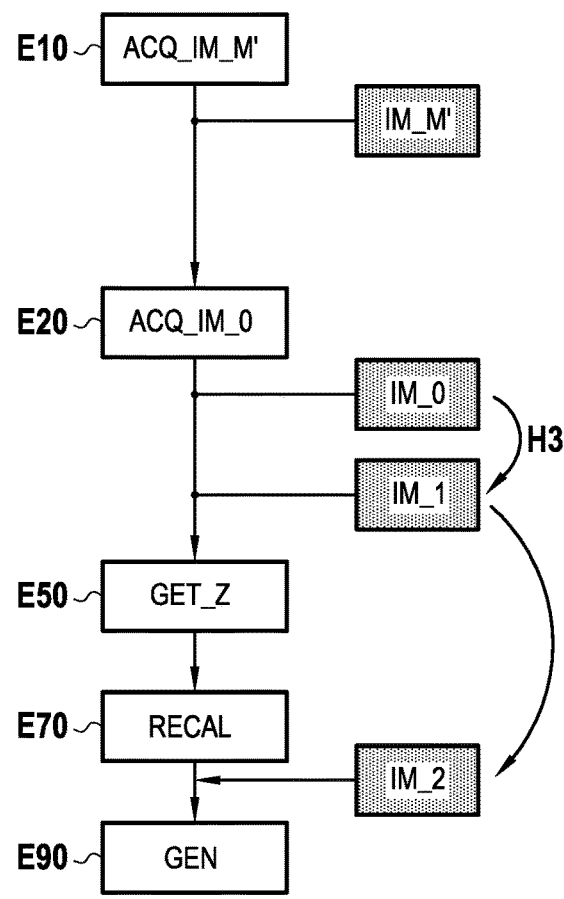
FIG. 26 shows the steps of a method in a fourth implementation of the invention for generating a digital signature of an examined surface.

The invention proposes a fourth implementation that is described below with reference to FIG. 26. The steps E20, E50, E70, and E90 of this fourth implementation are identical to the steps of the second variant of the second implementation and they have the same references.

It should be recalled that in the second variant of the second implementation, a homography transformation H2 is applied to the image, which transformation is accurately defined by the model image IM_M and by the "oriented" image IM_M'. In this sense, this homography transformation H2 may be said to be "static" in that it is always the same, regardless of the acquired image IM_0, except that the fourth implementation introduces a difference relative to the second variant of the second implementation that lies in replacing the constant or static homography transformation H2 by a homography transformation H3 that is calculated dynamically after the product step E20 as a function of the acquired image IM_0, relative to the oriented image IM_M'.

Thus, in this fourth implementation, the offset image IM_1 is obtained by applying the homography transformation H3 to the acquired image IM_0. Thereafter, the image IM_1 is registered relative to the oriented image IM_M' showing the reference surface S_REF, so as to obtain the registered image IM_2. The signature is then extracted by analyzing the registered image IM_2.

In this fourth implementation, the main advantage of dynamically calculating H3 is to facilitate positioning the acquisition module by making its orientation more "tolerant", e.g. more tolerant concerning the angle of inclination of its optical axis, thus serving to accelerate triggering acquisition and thereby enhancing the experience of the user.

To explain this, it should first be understood that the homography transformation H3 is said to be "dynamic" since it is calculated during acquisition as a function of the acquired image IM_0 and it does not depend on a particular orientation, whereas the homography transformation H2 (or H2') is calculated from the model image IM_M and the oriented image IM_M' simulating a particular orientation that is as close as possible to the orientation of the acquired image IM_0. H2 is thus a homography transformation that is said to be "constant".

Advantageously, by using the "dynamic" homography transformation H3 instead of a "constant" homography transformation such as H2 (cf. the second variant of the second implementation), it becomes possible to register the image dynamically while it is being acquired and to avoid any need to have an orientation for the acquisition of the acquired image IM_0 that is close to the orientation of the model image IM_M' in order to register the image correctly, as might be necessary in the other implementations.

FIG. 22 shows a system SYS for generating at least one digital signature from at least one examined surface, by performing any of the two general implementations of the invention.

The system SYS has an obtaining module MOD_OBT1 for obtaining for each examined surface S_1 an "offset" image IM_1 in which at least a portion shows the examined surface S_1.

The system SYS also has a definition module MOD_OBT2 that serves to obtain, for each examined surface S_1, zones of interest in the offset image.

These zones of interest are obtained by a template matching method applied to the offset image with said predetermined equivalent zones ZEQ_1, ZEQ_2, ZEQ_3, and ZEQ_4, these equivalent zones being contained in a model image IM_M having at least a portion showing the reference surface S_REF.

The system SYS also has a registering module MOD_RECAL for use with each examined surface S_1 to register the offset image IM_1 with the model module IM_M, this registering being performed by applying a first homography transformation H1 to the offset image IM_1, the homography transformation H1 being obtained from the zones of interest ZI_1, ZI_2, ZI_3, and ZI_4, and from the equivalent zones ZEQ_1, ZEQ_2, ZEQ_3, and ZEQ_4.

The system SYS also has a generator module MOD_GEN for generating, for each examined surface, a digital signature from the registered image IM_2, this digital signature characterizing the structure of the examined surface S_1.

Finally, the system SYS includes a storage medium SUP that serves to store a program PG including instructions for performing the method.

In a particular embodiment, and as shown in FIG. 23, the system SYS comprises:
a first module T1 including a first camera CAM_2 and a first source of light LUM_1 forming an angle of attack relative to the reference surface S_REF corresponding to a grazing angle of incidence, the angle of attack preferably lying in the range 16° to 45°, more preferably in the range 16° to 25°, still more preferably in the range 16° to 20°; and
a second product including a communicating terminal T2, a second camera CAM_1, and a second source of light LUM_2.

Figure 24:
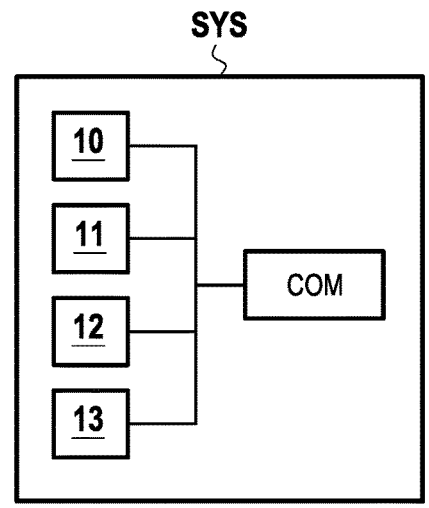

In the presently-described embodiment, the system SYS possesses the hardware architecture of a computer, as shown diagrammatically in FIG. 24.

The system SYS thus comprise a processor 10, a rewritable non-volatile memory 11, a ROM 12, a random access memory (RAM) 13, and a communications module COM.

The ROM 12 of the system SYS constitutes a data medium in accordance with the invention that is readable by the processor 10 and that stores a computer program in accordance with the invention including instructions for executing steps of a method of the invention for generating a digital signature of an examined surface, having the steps set out with reference to FIGS. 5 to 14, 18 and 19.

The invention claimed is:
1. A method of generating a digital signature for at least one surface of a material element, referred to as an "examined surface", said method being performed by a data processor system, said method comprising, for each said examined surface:

obtaining an offset image having at least a portion showing said examined surface;

obtaining at least one zone of interest in said offset image by template matching said offset image with at least one predetermined equivalent zone, said at least one predetermined equivalent zone being included in a model image having at least a portion representing a reference surface;

obtaining a repositioned image by image registration of the offset image with said model image, said image registration being performed by applying a first homography transformation to said offset image, said first homography transformation being obtained from said at least one zone of interest and from said at least one predetermined equivalent zone; and generating said digital signature from said repositioned image, said digital signature characterizing the structure of said examined surface.

2. The method according to claim 1, wherein obtaining said offset image includes acquiring an acquired image by a first acquisition module, said offset image being obtained from said acquired image.

3. The method according to claim 2, wherein said offset image corresponds to said acquired image and wherein said digital signature is generated by analyzing said repositioned image.

4. The method according to claim 2, including a prior step of acquiring an oriented image of said reference surface with a second acquisition module positioned substantially normally relative to said reference surface, wherein said model image is obtained by applying a second homography transformation to said oriented image.

5. The method according to claim 4, including obtaining a transformed image by transforming said repositioned image by applying to the repositioned image an inverse of said second homography transformation, and wherein said digital signature is generated by analyzing said transformed image.

6. The method according to claim 4, wherein said repositioned image is obtained by applying an inverse of said second homography transformation to said acquired image, and wherein said digital signature is generated by analyzing said repositioned image.

7. The method according to claim 1, including, for each examined surface, authenticating said examined surface, said authenticating being performed by comparing said generated digital signature with an authentic digital signature, said authentic digital signature characterizing the structure of said reference surface.

8. The method according to claim 7, including a prior step of:

generating said authentic digital signature from said model image, referred to as "generation of a first type", when said digital signature is generated by:

acquiring an acquired image by a first acquisition module, said offset image being obtained from said acquired image and corresponding thereto; and generating said digital signature by analyzing said repositioned image; or generating said authentic digital signature from said oriented image, referred to as "generation of a second type", when said digital signature is generated by:

acquiring an oriented image of said reference surface with a second acquisition module positioned substantially normally relative to said reference surface;

obtaining the model image by applying a second homography transformation to the oriented image, wherein obtaining said offset image includes acquiring an acquired image by a first acquisition module, said offset image being obtained from said acquired image; and;

obtaining the repositioned image by applying an inverse of the second homography transformation to the acquired image, wherein said digital signature is generated by analyzing said repositioned image.

9. The method according to claim 8, wherein said generating said authentic digital signature comprises:

acquiring, by a third acquisition module, said reference surface; and during the acquiring by the third acquisition module, illuminating said reference surface with a first source of light;

the acquiring corresponding to:

acquiring said model image if said generation is of said first type; or acquiring said oriented image if said generation is of said second type.

10. The method according to claim 9, wherein the optical axis of said third module is oriented substantially normally relative to said reference surface, said reference surface being illuminated during said lighting by said first source of light with an angle of attack relative to said reference surface corresponding to a grazing angle of incidence.

11. The method according to claim 10, wherein said angle of attack lies in the range 16° to 45°.

12. The method according to claim 7, including a prior step of generating said authentic signature, referred to as "generation of a third type", said generation of the third type comprising:

acquiring said model image, by an acquisition module;

during at least the acquiring of the model image, illuminating said reference surface with a source of light, the optical axis of said acquisition module and the optical axis of said source of light having substantially the same orientation relative to the reference surface; and analyzing a re-oriented image, said re-oriented image being obtained by applying a homography transformation compensating for orientation of the acquisition module and orientation of the source of light;

wherein said offset image corresponds to said acquired image:

said method including, at least during said acquiring by said first acquisition module, illuminating said examined surface by a second source of light, and wherein said generating includes obtaining a structural characteristic of said examined surface by detecting interaction between said examined surface with said second source of light, the optical axes of said first acquisition module and said second source of light being oriented substantially to have the same orientation relative to said examined surface; and said interaction being detected by analyzing a flattened-out image, said flattened-out image being obtained by a homography transformation compensating for the orientation of the first acquisition module and the orientation of the second source of light.

13. The method according to claim 2, including, at least during the acquiring by said first acquisition module, illuminating the examined surface by a second source of light, wherein the generating said digital signature includes obtaining a structural characteristic of said examined surface by detecting interaction between said examined surface and said second source of light, said detection of interaction being performed:

by analyzing said repositioned image if said generation is of a first type; or by analyzing said transformed image obtained from said repositioned image, if said generation is of a second type.

14. The method according to claim 12, wherein in order to acquire at least two images by said first module, for each of said at least two acquired images, said second light source is located in the same position and in the same orientation relative to said first module.

15. The method according to claim 1, including reading protected information, said protected information being subjected in digital form to digital processing that is an inverse of a processing used for protecting the information, said digital processing making use of said generated digital signature.

16. The method according to claim 15, wherein said protected information is contained in a visual code arranged on said examined surface or on a product or on a package including said examined surface.

17. The method according to claim 16, wherein said visual code corresponds to a one-dimensional or two-dimensional bar code.

18. The method according to claim 1, including defining at least one search zone in said offset image, said at least one search zone including said at least one zone of interest, and wherein said template matching is performed on the basis of said at least one search zone.

19. The method according to claim 18, wherein said template matching serves, on the basis of said at least one search zone, to obtain a first estimate of parameters for an affine transformation that transforms predetermined points of said at least one zone of interest into corresponding predetermined points of said predetermined equivalent zone.

20. The method according to claim 19, wherein said first estimate of parameters is obtained by using a least squares method between coordinates of said predetermined points of said predetermined equivalent zone and coordinates of said predetermined points of said at least one zone of interest.

21. The A method according to claim 19, wherein said first estimate is obtained by using a cross-correlation method between the coordinates of said predetermined points of said predetermined equivalent zone, and the coordinates of said predetermined points of said at least one zone of interest.

22. The method according to claim 19, wherein said template matching includes obtaining a second estimate of said parameters, said second estimate being obtained by optimizing said first estimate with an iterative algorithm seeking to maximize a first enhanced correlation coefficient between said predetermined equivalent zone and said at least one search zone.

23. The method according to claim 1, wherein said reference surface constitutes a surface of inclination and position that are known relative to an acquisition plane of said model image.

24. The method coding to claim 1, wherein said first homography transformation is obtained by using a random sample consensus algorithm.

25. The method according to claim 1, wherein said first homography transformation is obtained by using an iterative optimization algorithm seeking to maximize a second enhanced correlation coefficient between said offset image and said model image.

26. The method according to claim 1, wherein said first homography transformation is obtained from coordinates of pairs of points, each pair of the pairs of points comprising one point in said predetermined equivalent zone and another point in a said at least one zone of interest defined by said template matching between said predetermined equivalent zone and said offset image.

27. The method according to claim 26, wherein said pairs of points include centers of said at least one zone of interest and of said at predetermined equivalent zone.

28. The method according to claim 1, wherein said at least one zone of interest is positioned around and/or relative to a graphics element present on said examined surface, said graphics element also being present on said reference surface.

29. The method according to claim 1, wherein said digital signature is generated from at least one structural characteristic of said examined surface, said examined surface being constituted by a material element comprising one or more of: a fiber material, a plastics material, a metal material, leather, wood, a composite material, glass, and a mineral.

30. The method according to claim 1, including a prior step of defining said at least one equivalent zone in said model image.

31. The method according to claim 2, wherein said examined surface includes a symbol, the acquiring of the acquired image being triggered automatically as a function of determining an orientation for said first acquisition module relative to the examined surface, said determination being performed from an image of said symbol.

32. The method according to claim 31, comprising displaying on a screen of a terminal including said at first acquisition module, an image of the acquisition field of said first acquisition module, in which there is superposed a virtual symbol, and wherein the acquiring of the acquired image is triggered automatically as a function of the relative position of an image of said symbol in said acquisition field and a position of said virtual symbol.

33. The method according to claim 32, wherein the acquiring of the acquired image is triggered automatically when the image of said symbol in said acquisition field coincides with said virtual symbol.

34. A system for generating at least one digital signature of at least one surface of a material element, referred to as the "examined surface", said system comprising:

a processor;

a non-transitory data storage medium storing instructions that when executed by the processor cause the processor to carry out operations comprising:

obtaining, for each said examined surface, an offset image having at least a portion that shows said examined surface;

obtaining, for each said examined surface, at least one zone of interest in said offset image by template matching between said offset image and at least one predetermined equivalent zone, said at least one predetermined equivalent zone being contained in a model image having at least a portion showing a reference surface;

for each said examined surface, performing image registration of said offset image with said model image to produce a "repositioned image", said image registration being performed by applying a first homography transformation to said offset image, said first homography transformation being obtained from said at least one zone of interest and from said at least one equivalent zone; and for each said examined surface, generating a said digital signature from said repositioned image, said digital signature characterizing the structure of said examined surface.

35. The system according to claim 34, said system including:
- a first camera and a first source of light forming an angle of attack relative to said reference surface corresponding to a grazing angle of incidence; or
- a communicating terminal, a second camera, and a second source of light.

36. The system according to claim 35, wherein said communicating terminal comprises a cell phone or a tablet, wherein said second camera comprises a camera of said cell phone or of said tablet, and wherein said second source of light comprises a flash of said cell phone or of said tablet.

37. A non-transitory data medium readable by a computer and storing a computer program including instructions that when executed by the computer perform a method comprising:

obtaining an offset image having at least a portion showing an examined surface of at least one surface of a material element;

obtaining at least one zone of interest in said offset image by template matching said offset image with at least one predetermined equivalent zone, said at least one predetermined equivalent zone being included in a model image having at least a portion representing a reference surface;

obtaining a repositioned image by image registration of said offset image with said model image, said image registration being performed by applying a first homography transformation to said offset image, said first homography transformation being obtained from said at least one zone of interest and from said at least one equivalent zone; and generating a digital signature from said repositioned image, said digital signature characterizing the structure of said examined surface.

* * * * *